(No Model.)

W. D. TRIMBLE.
DECOY DUCK.

No. 378,410. Patented Feb. 21, 1888.

WITNESSES:
R. L. Clemmitt
John E. Morris.

INVENTOR:
W. D. Trimble

BY Chas B. Mann
ATTORNEY.

United States Patent Office.

WILLIAM D. TRIMBLE, OF HAMPDEN, MARYLAND, ASSIGNOR OF ONE-HALF TO JOHN T. FREELAND, OF SAME PLACE.

DECOY-DUCK.

SPECIFICATION forming part of Letters Patent No. 378,410, dated February 21, 1888.

Application filed November 16, 1887. Serial No. 255,291. (No model.)

*To all whom it may concern:*

Be it known that I, WILLIAM D. TRIMBLE, a citizen of the United States, residing at Hampden, in the county of Baltimore and State of Maryland, have invented certain new and useful Improvements in Decoy-Ducks, of which the following is a specification.

My invention relates to an improved decoy-duck for the use of sportsmen, and is illustrated in the accompanying drawings, in which—

Figure 1:
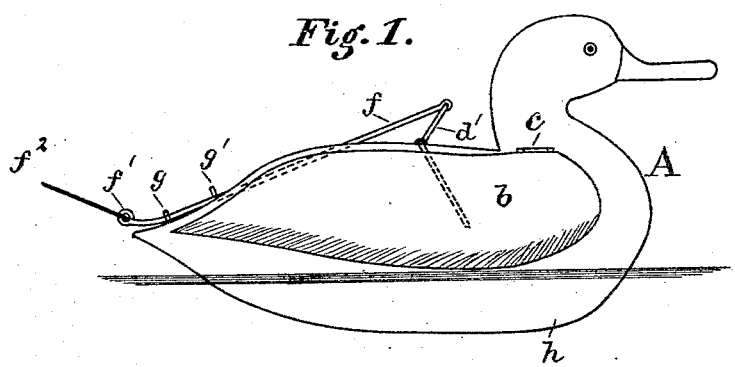
Figure 2:
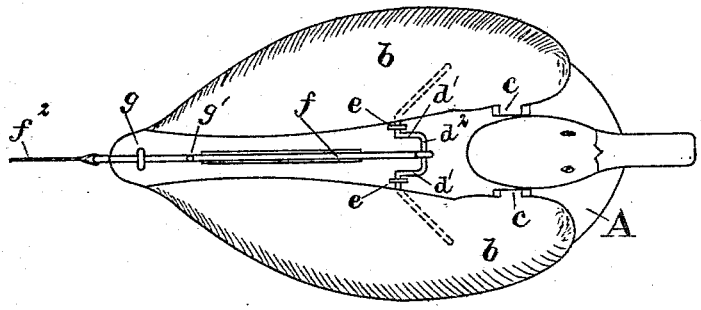
Figure 3:
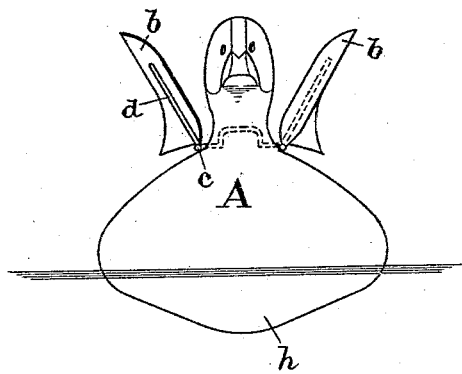

Figure 1 is a side view of the decoy. Fig. 2 is a top view of same. Fig. 3 is a front view.

Decoy-ducks are employed to float on the water near the sportsman, who is concealed by a "blind" or suitable screen, and are designed to allure the wild ducks to the vicinity in order to afford the sportsman a close shot.

It is well known that wild ducks are attracted by the movement of anything on the water. The ordinary decoy-duck simply floats, and is lacking in provision for such a movement as would attract attention.

The object of my invention is to provide for imparting a movement to the wings of the floating duck, as hereinafter described.

The letter A designates the body of the duck. The wings $b$ are hinged or jointed to the body at $c$, whereby they may be raised and lowered to imitate flapping. Each wing is raised by a lever, $d$, which has position below the wing and is pivoted at $e$ on the duck's back, and an arm, $d'$, of the lever projects up over the back. For convenience of construction the two arms $d'$ are connected by a bar, $d^2$, and a wire, $f$, or cord (preferably a wire) is attached to the bar $d^2$. By drawing on the wire the two levers $d$ are raised and act on the under side of the wing, and serve to raise the wing to the position shown in Fig. 3.

The duck's back near the tail has a staple, $g$, through which the wire $f$ passes loosely, and said wire has a swell or enlargement, $g'$, which will not pass through the staple $g$, and acts as a stop when it comes in contact with the staple. Thus, on drawing or pulling the wire $f$, the wings $b$ will be raised; but when the swell $g'$ comes against the staple $g$ the wire can be drawn no farther. The end of the wire $f$ has an eye, $f'$, to which a cord, $f^2$, is attached. The duck is to be anchored in the water wherever desired, a cord and weight for this purpose being attached at the under side, say at the breast $h$. The cord $f^2$ will lead to the blind where the gunner is concealed. By drawing on the said cord $f^2$ the movement may be imparted to the wings in imitation of flapping.

Having described my invention, I claim and desire to secure by Letters Patent of the United States—

1. A decoy-duck having staples or eyes secured to the back thereof, through which pass the arms of a double-crank lever, said arms being prolonged and bent upward to vibrate the wings of the decoy through a connecting rod and cord attached to said double-crank lever, substantially as specified.

2. A decoy-duck provided with a double-crank-armed rocking lever adapted to operate the wings of said decoy by means of a wire connected thereto, having a cord connected to the outer end thereof, as shown and described.

In testimony whereof I affix my signature in the presence of two witnesses.

WILLIAM D. TRIMBLE.

Witnesses:
JOHN E. MORRIS,
JNO. T. MADDOX.